(12) United States Patent
Lee

(10) Patent No.: US 8,975,844 B2
(45) Date of Patent: Mar. 10, 2015

(54) MOTOR DRIVING APPARATUS

(71) Applicant: Samsung Electro-Mechanics Co., Ltd., Suwon, Gyunggi-do (KR)

(72) Inventor: Soo Woong Lee, Gyunggi-do (KR)

(73) Assignee: Samsung Electro-Mechanics Co., Ltd., Suwon, Gyeonggi-Do (KR)

( * ) Notice: Subject to any disclaimer, the term of this patent is extended or adjusted under 35 U.S.C. 154(b) by 125 days.

(21) Appl. No.: 13/747,126

(22) Filed: Jan. 22, 2013

(65) Prior Publication Data

US 2014/0117897 A1 May 1, 2014

(30) Foreign Application Priority Data

Nov. 1, 2012 (KR) .......................... 10-2012-0123072

(51) Int. Cl.
- *H03K 5/00* (2006.01)
- *H02P 6/00* (2006.01)
- *G01D 5/14* (2006.01)
- *H02P 27/08* (2006.01)

(52) U.S. Cl.
CPC ............... *H02P 6/002* (2013.01); *G01D 5/145* (2013.01); *H02P 27/08* (2013.01)
USPC .................................. 318/400.13

(58) Field of Classification Search
CPC ........................................ G01D 5/145
USPC ..................................... 318/400.13
See application file for complete search history.

(56) References Cited

U.S. PATENT DOCUMENTS

| | | | | |
|---|---|---|---|---|
| 7,208,919 | B2* | 4/2007 | May .............................. | 323/211 |
| 7,714,674 | B2* | 5/2010 | Guo et al. ...................... | 331/176 |
| 7,747,146 | B2* | 6/2010 | Milano et al. ................. | 388/811 |
| 8,008,908 | B2* | 8/2011 | Doogue et al. ................. | 324/173 |
| 2008/0252245 | A1 | 10/2008 | Chen et al. | |

FOREIGN PATENT DOCUMENTS

| | | |
|---|---|---|
| JP | 06-078873 U | 11/1994 |
| JP | 2009303434 A | 12/2009 |

OTHER PUBLICATIONS

Notice of Office Action Japanese Patent Application No. 2013-007635 dated Dec. 3, 2013 with English translation.
Korean Office Action issued in Application No. 10-2012-0123072 dated Oct. 30, 2013.

* cited by examiner

*Primary Examiner* — Erick Glass
(74) *Attorney, Agent, or Firm* — McDermott Will & Emery LLP

(57) ABSTRACT

There is provided a motor driving apparatus capable of stably performing operation conversion between a normal mode and a sleep mode by counting a duty of the PWM signal according to a preset clock signal, the motor driving apparatus including: a pulse width modulation (PWM) signal generating unit providing a PWM signal for driving a motor; a driving unit operating normally in a normal mode and waiting for operation in a sleep mode according to a control, and driving the motor in response to the PWM signal of the PWM signal generating unit; and a driving controlling unit counting a duty of the PWM signal according to a preset clock signal to determine an operation mode of the driving unit.

11 Claims, 4 Drawing Sheets

MOTOR DRIVING APPARATUS

CROSS-REFERENCE TO RELATED APPLICATIONS

This application claims the priority of Korean Patent Application No. 10-2012-0123072 filed on Nov. 1, 2012, in the Korean Intellectual Property Office, the disclosure of which is incorporated herein by reference.

BACKGROUND OF THE INVENTION

1. Field of the Invention

The present invention relates to a motor driving apparatus capable of operating in a normal mode or a sleep mode.

2. Description of the Related Art

In general, there has been increasing demand for electric or electronic devices in domestic, industrial and commercial settings in recent times.

In electric or electronic devices, a driving circuit for controlling a specific operation may be used, and as an example of a device using such a circuit, there is provided a motor.

A brushless direct current (BLDC) motor generally refers to a DC motor having a function of conducting current to a motor coil or adjusting a direction in which current flows in the motor coil, using a non-contact position detector and a semiconductor device, rather than a mechanical contact unit such as a brush, a commutator, or the like, in a DC motor.

In order to drive a BLCD motor, a driving apparatus may be used.

FIG. 1 is a schematic circuit diagram of a general motor driving apparatus.

Referring to FIG. 1, the general motor driving apparatus 10 may include a controlling unit 11 and a driving unit 12.

The controlling unit 11 may control driving of the motor, and the driving unit 12 may drive the motor by turning four field effect transistors (FETs) on or off in response to driving signals of the controlling unit 11 POUT1, POUT2, NOUT1, and NOUT2. In addition, as shown in FIG. 1, driving power VDD, required for motor driving, may be supplied.

FIG. 2 is a diagram showing driving signals of the motor driving apparatus shown in FIG. 1.

Referring to FIGS. 1 and 2, driving signals transferred from the controlling unit 11 to the driving unit 12 may be divided into four types and may be transferred in a sequence of identification numerals ①, ②, ③, and ④.

That is, a first PMOS FET P1 and a second NMOS FET N2 may be turned on in response to a driving signal represented by identification numeral ①, and the first PMOS FET P1 and the second NMOS FET N2 may be turned off and a second PMOS FET P2 and a first NMOS FET N1 may be turned on in response to a driving signal represented by identification numeral ②.

Again, the second PMOS FET P2 and the first NMOS FET N1 may be turned off and the first PMOS FET P1 and the second NMOS FET N2 may be turned on in response to a driving signal represented by identification numeral ③, and the first PMOS FET P1 and the second NMOS FET N2 may be turned off and the second PMOS FET P2 and the first NMOS FET N1 may be turned on in response to a driving signal represented by identification numeral ④.

In this driving scheme, when the first PMOS FET P1 and the second PMOS FET P2 are turned on, pulse width modulation (PWM) signals (oblique line portions of FIG. 2) are generated, whereby a speed of the motor may be controlled.

The motor driving apparatus as described above may have a function of operating normally in a normal mode and waiting for operation in a sleep mode in order to reduce consumption of current used in the invention disclosed in the Related Art Document.

As in the Related Art Document below, the normal mode and the sleep mode may be determined by the PWM signal.

FIG. 3 is a diagram showing operation conversion between the normal mode and the sleep mode.

Referring to FIG. 3, in the case in which the PWM signal is present for a preset time (for example, 1 ms), the motor driving apparatus may be operated in the normal mode N-M, and in the case in which the PWM signal is not present, the motor driving apparatus may be operated in the sleep mode S-M. Thereafter, in the case in which the PWM signal is present again, the motor driving apparatus may be returned to the normal mode.

Meanwhile, FIG. 4 is a diagram showing operation conversion between the normal mode and the sleep mode by noise.

As shown in FIG. 4, in the motor driving apparatus, conversion between the normal mode and the sleep mode may be frequently generated by unintended noise, which may increase power consumption of the motor driving apparatus.

RELATED ART DOCUMENT

US Patent Laid-Open Publication No. 2008/0252245

SUMMARY OF THE INVENTION

An aspect of the present invention provides a motor driving apparatus capable of stably performing operation conversion between a normal mode and a sleep mode by counting a duty of the PWM signal according to a preset clock signal.

According to an aspect of the present invention, there is provided a motor driving apparatus including: a pulse width modulation (PWM) signal generating unit providing a PWM signal for driving a motor; a driving unit operating normally in a normal mode and waiting for operation in a sleep mode according to a control, and driving the motor in response to the PWM signal of the PWM signal generating unit; and a driving controlling unit counting a duty of the PWM signal according to a preset clock signal to determine an operation mode of the driving unit.

The driving controlling unit may include: a duty operator counting a duty of the PWM signal in response to the clock signal; a reference clock generator providing the clock signal having a preset time interval to the duty operator; and a mode determiner comparing a duty count value from the duty operator and a preset reference value with each other to determine the operation mode according to the compared result.

The driving controlling unit may further include a reference value selector providing the reference value according to user choice among a plurality of preset reference values.

The mode determiner may control an operation of the driving unit in the normal mode when the count value of the duty operator is equal to or higher than the reference value and control the operation of the driving unit in the sleep mode when the count value of the duty operator is lower than the reference value.

The motor may be a single phase motor or a three phase motor.

The duty operator may count an on-duty of the PWM signal.

The duty operator may count an off-duty of the PWM signal.

The mode determiner may control an operation of the driving unit in the normal mode when the count value of the duty operator is lower than the reference value and control the operation of the driving unit in the sleep mode when the count value of the duty operator is the same as or higher than the reference value.

According to another aspect of the present invention, there is provided a motor driving apparatus including: a pulse width modulation (PWM) signal generating unit providing a PWM signal for driving a single phase or a three phase motor; a driving unit operating normally in a normal mode and waiting for operation in a sleep mode according to a control and driving the motor in response to the PWM signal of the PWM signal generating unit; and a driving controlling unit counting an on-duty or an off-duty of the PWM signal according to a preset clock signal to determine an operation mode of the driving unit.

The driving control unit may include: a duty operator counting the on-duty or the off-duty of the PWM signal according to the clock signal; a reference clock generator providing the clock signal having a preset time interval to the duty operator; and a mode determiner comparing a duty count value from the duty operator and a preset reference value with each other to determine the operation mode according to the compared result.

In the case in which the duty operator counts the on-duty of the PWM signal, the mode determiner may control an operation of the driving unit in the normal mode when the count value of the duty operator is equal to or higher than a reference value and control the operation of the driving unit in the sleep mode when the count value of the duty operator is lower than the reference value, and in the case in which the duty operator counts the off-duty of the PWM signal, the mode determiner may control an operation of the driving unit in the normal mode when the count value of the duty operator is lower than the reference value and control the operation of the driving unit in the sleep mode when the count value of the duty operator is the same as or higher than the reference value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
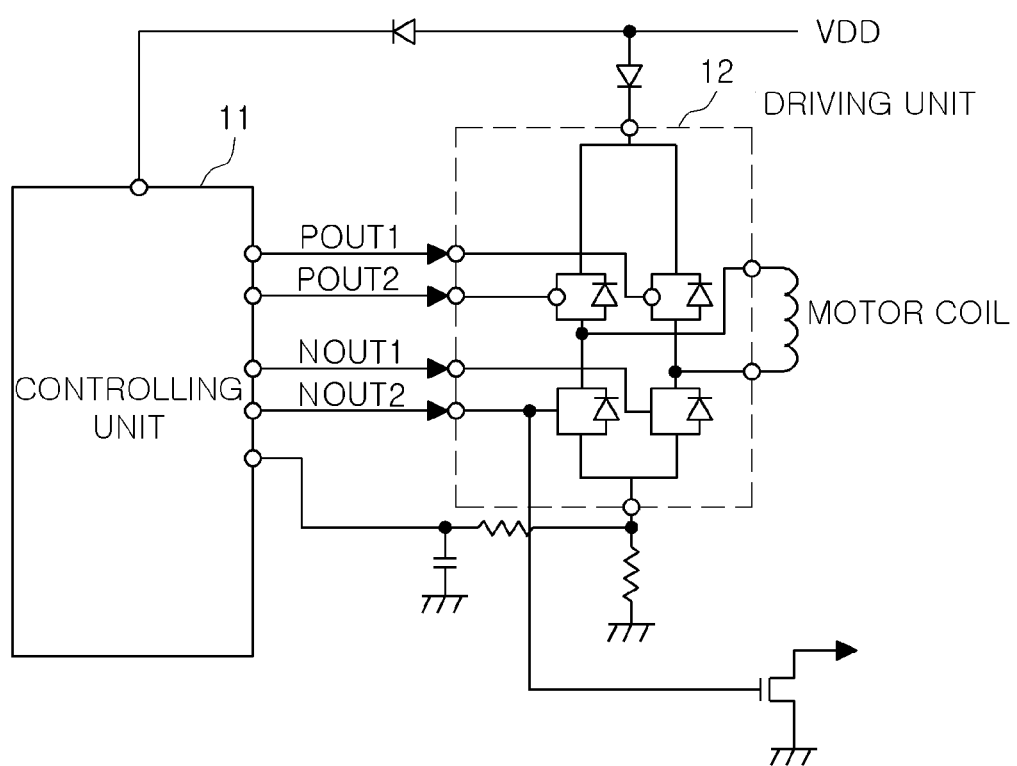
FIG. 1 is a schematic circuit diagram of a general motor driving apparatus.
Figure 2:
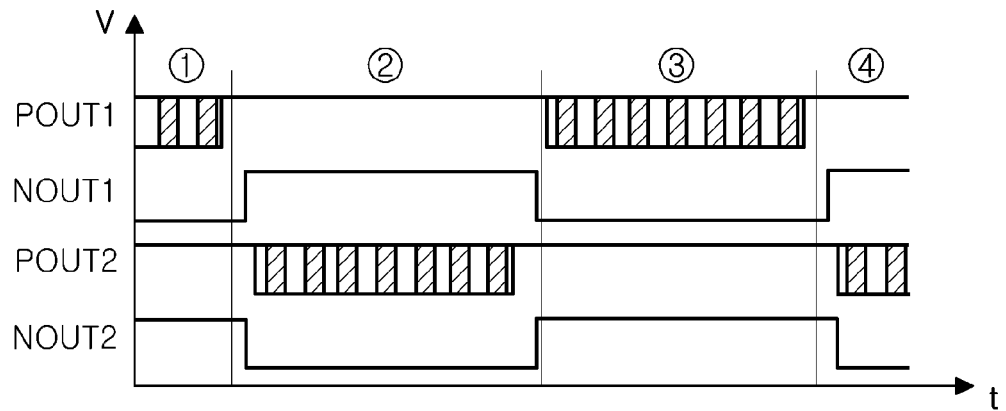
FIG. 2 is a diagram showing driving signals of the motor driving apparatus shown in FIG. 1.
Figure 3:
FIG. 3 is a diagram showing general operation conversion between a normal mode and a sleep mode.
Figure 4:
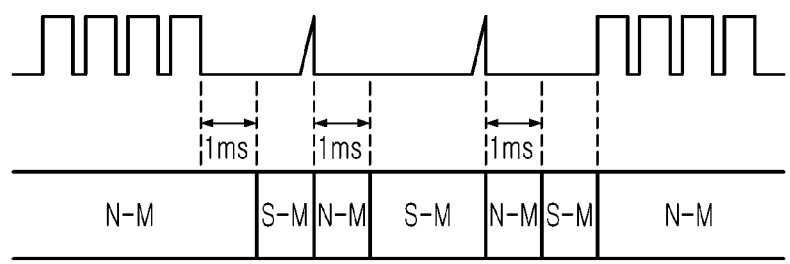
FIG. 4 is a diagram showing operation conversion between a normal mode and a sleep mode by noise.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Figure 5:
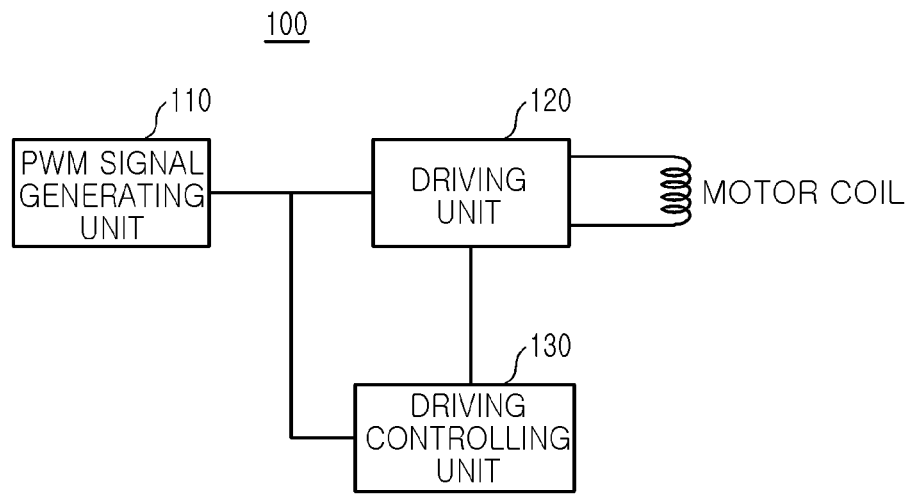
FIG. 5 is a schematic block diagram of a motor driving apparatus according to an embodiment of the present invention.

FIG. 5 is a schematic block diagram of a motor driving apparatus according to an embodiment of the present invention.

Referring to FIG. 5, a motor driving apparatus 100 according to the embodiment of the present invention may include a PWM signal generating unit 110, a driving unit 120, and a driving controlling unit 130.

The PWM signal generating unit 110 may provide a pulse-width modulation (PWM) signal driving a motor, and the driving unit 120 may generate a driving signal driving the motor through the PWM signal to drive the motor. Here, the motor may be a single phase motor or a three phase motor.

The driving controlling unit 130 may control operations of the driving unit 120 based on the PWM signal.

That is, the driving unit 120 may operate in a normal mode so as to drive the motor normally and operate in a sleep mode so as to wait for the motor driving at the time of motor driving operation, and the driving controlling unit 130 may control the operation mode of the driving unit 120 based on the PWM signal.

Figure 6:
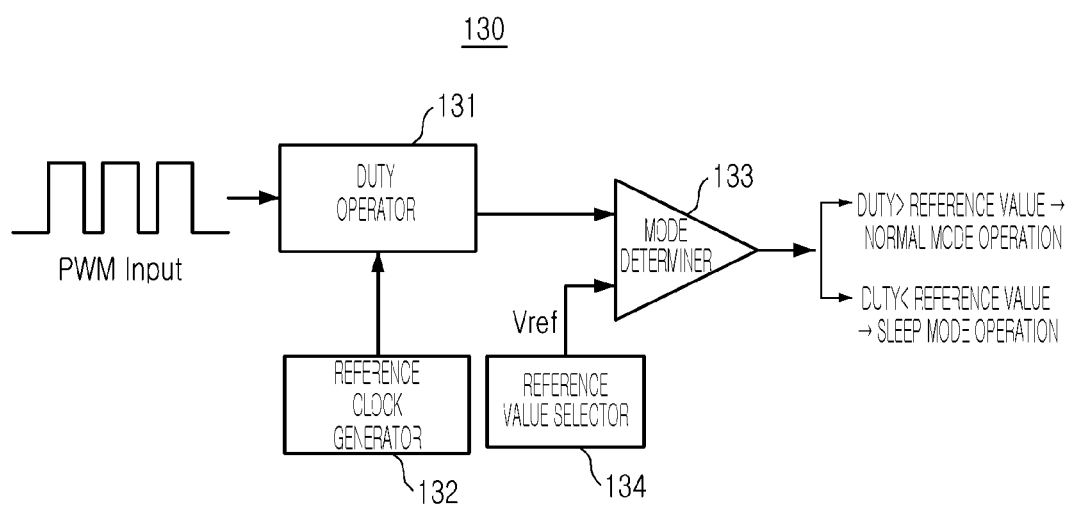
FIG. 6 is a schematic block diagram of a driving controlling unit used in the motor driving apparatus according to the embodiment of the present invention.

FIG. 6 is a schematic block diagram of a driving controlling unit used in the motor driving apparatus according to the embodiment of the present invention.

Referring to FIG. 6, the driving controlling unit 130 used in the motor driving apparatus 100 according to the embodiment of the present invention may include a duty operator 131, a reference clock generator 132, a mode determiner 133, and a reference value selector 134.

The duty operator 131 may count a duty of the PWM signal according to a provided clock signal. Here, the duty of the counted PWM signal may be on-duty or off-duty.

The reference clock generator 132 may provide the clock signal having a preset time interval and provide the clock signal to the duty operator 131 by the time interval, and the duty operator 131 may count the clock signal in the on-duty or the off-duty.

Figure 7:
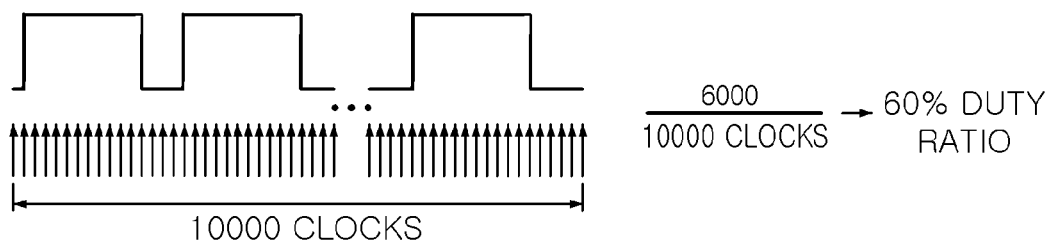
FIGS. 7 and 8 are diagrams showing duty count by the driving controlling unit used in the motor driving apparatus according to the embodiment of the present invention.
Figure 8:
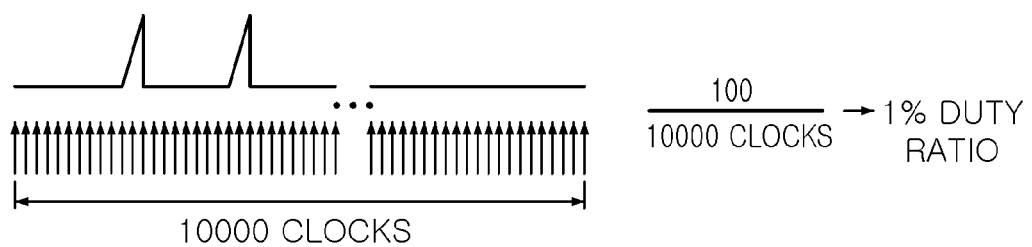

FIGS. 7 and 8 are diagrams showing duty count by the driving controlling unit used in the motor driving apparatus according to the embodiment of the present invention.

Referring to FIG. 7, in the case in which 10,000 clock signals are provided during at least one duty cycle or during a plurality of duty cycles, in an on-duty of a normal PWM signal, for example, 6,000 clock signals may be counted, and thus the on-duty of the PWM signal may have an on-duty ratio of 60%.

On the contrary, referring to FIG. 8, in the case in which 10,000 clock signals are similarly provided during one duty cycle, a noise signal may have a width narrower than that in the on-duty of the normal PWM signal, and for example, 100 clock signals may be counted. Therefore, the noise may have an on-duty ratio of 1% in the case in which the noise is assumed as the PWM signal.

As described above, the duty operator counts the on-duty of the noise PWM signal but may count the off-duty thereof.

The mode determiner 133 may compare a reference value selected from the reference value selector 134 with the count value from the duty operator 131 to control the operation of the driving unit 120 in the normal mode or the sleep mode according to the compared result. The reference value from the reference value selector 134 may provide a reference to determine the normal PWM signal and the noise, and the reference value may be variously set, for example, to 1,000 clock signals, 2,000 clock signals, or the like, according to user choice.

That is, when the mode determiner compares the count value and the reference value with each other, in the case in which the count value is higher than the reference value, the mode determiner may determine that the signal is a normal PWM signal to control the driving unit 120 to operate in the normal mode, and in the case in which the count value is lower than the reference value, the mode determiner may determine that the signal is noise to control the driving unit 120 to maintain the sleep mode.

The mode control operation described above corresponds to the case of counting the on-duty of the PWM signal. To the contrary, in the case of counting the off-duty and the count value is lower than the reference value, the signal is determined as the normal PWM signal, and in the case in which the count value is higher than the reference value, the signal is determined as the noise, such that the mode determiner may control the operation of the driving unit 120 to operate in the normal mode or sleep mode, corresponding thereto.

As set forth above, according to the embodiment of the present invention, the duty of the PWM signal is counted according to the preset clock signal to stably perform the operation conversion between the normal mode and the sleep mode, whereby wasting power consumed due to unintended operation conversion caused by the noise may be prevented.

While the present invention has been shown and described in connection with the embodiments, it will be apparent to those skilled in the art that modifications and variations can be made without departing from the spirit and scope of the invention as defined by the appended claims.

What is claimed is:

1. A motor driving apparatus, comprising:
a pulse width modulation (PWM) signal generating unit providing a PWM signal for driving a motor;
a driving unit operating normally in a normal mode and waiting for operation in a sleep mode according to a control, and driving the motor in response to the PWM signal of the PWM signal generating unit; and
a driving controlling unit counting a duty of the PWM signal according to a preset clock signal to determine an operation mode of the driving unit,
wherein the driving controlling unit includes:
a duty operator counting a duty of the PWM signal in response to the clock signal;
a reference clock generator providing the clock signal having a preset time interval to the duty operator;
a mode determiner comparing a duty count value from the duty operator and a preset reference value with each other to determine the operation mode according to the compared result, and
a reference value selector providing the reference value according to user choice among a plurality of preset reference values.

2. The motor driving apparatus of claim 1, wherein the motor is a single phase motor or a three phase motor.

3. The motor driving apparatus of claim 1, wherein the duty operator counts an on-duty of the PWM signal.

4. The motor driving apparatus of claim 1, wherein the duty operator counts an off-duty of the PWM signal.

5. The motor driving apparatus of claim 4, wherein the mode determiner controls an operation of the driving unit in the normal mode when the count value of the duty operator is lower than the reference value and controls the operation of the driving unit in the sleep mode when the count value of the duty operator is the same as or higher than the reference value.

6. A motor driving apparatus, comprising:
a pulse width modulation (PWM) signal generating unit providing a PWM signal for driving a motor;
a driving unit operating normally in a normal mode and waiting for operation in a sleep mode according to a control, and driving the motor in response to the PWM signal of the PWM signal generating unit; and
a driving controlling unit counting a duty of the PWM signal according to a preset clock signal to determine an operation mode of the driving unit,
wherein the driving controlling unit includes:
a duty operator counting a duty of the PWM signal in response to the clock signal;
a reference clock generator providing the clock signal having a preset time interval to the duty operator; and
a mode determiner comparing a duty count value from the duty operator and a preset reference value with each other to determine the operation mode according to the compared result, and
wherein the mode determiner controls an operation of the driving unit in the normal mode when the count value of the duty operator is equal to or higher than the reference value and controls the operation of the driving unit in the sleep mode when the count value of the duty operator is lower than the reference value.

7. The motor driving apparatus of claim 6, wherein the motor is a single phase motor or a three phase motor.

8. The motor driving apparatus of claim 6, wherein the duty operator counts an on-duty of the PWM signal.

9. The motor driving apparatus of claim 6, wherein the duty operator counts an off-duty of the PWM signal.

10. The motor driving apparatus of claim 9, wherein the mode determiner controls an operation of the driving unit in the normal mode when the count value of the duty operator is lower than the reference value and controls the operation of the driving unit in the sleep mode when the count value of the duty operator is the same as or higher than the reference value.

11. A motor driving apparatus comprising:
a pulse width modulation (PWM) signal generating unit providing a PWM signal for driving a single phase or three phase motor;
a driving unit operating normally in a normal mode and waiting for operation in a sleep mode according to a control and driving the motor in response to the PWM signal of the PWM signal generating unit; and
a driving controlling unit counting an on-duty or an off-duty of the PWM signal according to a preset clock signal to determine an operation mode of the driving unit;
wherein the driving control unit includes:
a duty operator counting the on-duty or the off-duty of the PWM signal according to the clock signal;
a reference clock generator providing the clock signal having a preset time interval to the duty operator; and
a mode determiner comparing a duty count value from the duty operator and a preset reference value with each other to determine the operation mode according to the compared result, and
wherein in the case in which the duty operator counts the on-duty of the PWM signal,
the mode determiner controls an operation of the driving unit in the normal mode when the count value of the duty operator is equal to or higher than a reference value and controls the operation of the driving unit in the sleep mode when the count value of the duty operator is lower than the reference value, and in the case in which the duty operator counts the off-duty of the PWM signal, the mode determiner controls an operation of the driving unit in the normal mode when the count value of the duty operator is lower than the reference value and controls the operation of the driving unit in the sleep mode when the count value of the duty operator is the same as or higher than the reference value.

* * * * *